United States Patent
Dasbach et al.

(10) Patent No.: US 9,834,277 B2
(45) Date of Patent: Dec. 5, 2017

(54) METHOD AND DEVICE FOR CONTROLLING A PEDAL-OPERATED VEHICLE

(71) Applicant: ROBERT BOSCH GMBH, Stuttgart (DE)

(72) Inventors: Gregor Dasbach, Reutlingen (DE); Sigmund Braun, Kusterdingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/396,357

(22) PCT Filed: Feb. 25, 2013

(86) PCT No.: PCT/EP2013/053698
§ 371 (c)(1),
(2) Date: Oct. 22, 2014

(87) PCT Pub. No.: WO2013/159952
PCT Pub. Date: Oct. 31, 2013

(65) Prior Publication Data
US 2015/0094890 A1    Apr. 2, 2015

(30) Foreign Application Priority Data

Apr. 23, 2012    (DE) .................. 10 2012 206 615

(51) Int. Cl.
*B62M 6/45*    (2010.01)
*B62M 6/50*    (2010.01)

(52) U.S. Cl.
CPC ............... *B62M 6/45* (2013.01); *B62M 6/50* (2013.01)

(58) Field of Classification Search
CPC ........................................... B62M 6/45
USPC ................................................. 701/22
See application file for complete search history.

(56) References Cited

U.S. PATENT DOCUMENTS

| | | | |
|---|---|---|---|
| 4,942,936 A * | 7/1990 | Gardner, Jr. ............ | B62M 6/40 180/206.1 |
| 2002/0194948 A1* | 12/2002 | Sundaresan ............ | G05G 1/405 74/560 |
| 2012/0226400 A1* | 9/2012 | Hsu ........................ | B62M 6/45 701/22 |

(Continued)

FOREIGN PATENT DOCUMENTS

| CN | 101987650 A | 3/2011 |
|---|---|---|
| CN | 102060020 A | 5/2011 |
| CN | 102371960 A | 3/2012 |

(Continued)

OTHER PUBLICATIONS

International Search Report for PCT/EP2013/053698, dated May 7, 2013.

*Primary Examiner* — Jerrah Edwards
*Assistant Examiner* — Majdi Alsomiri
(74) *Attorney, Agent, or Firm* — Norton Rose Fulbright US LLP; Gerard Messina

(57) ABSTRACT

In a method for controlling a pedal- and motor-driven bicycle, the motor in the vehicle being able to assist the driver at least in a pushing operation, the movement or state variable of the pedal is compared with a threshold value in the pushing operation, and the driving of the vehicle is modified at least briefly as a function of the exceeding or not attaining of this threshold value.

8 Claims, 2 Drawing Sheets

(56) References Cited

U.S. PATENT DOCUMENTS

2013/0179016 A1* 7/2013 Gale .................... B60L 11/007
701/22

FOREIGN PATENT DOCUMENTS

| | | |
|---|---|---|
| FR | 2 768 991 | 4/1999 |
| JP | H04 358988 | 12/1992 |
| JP | H07-002164 A | 1/1995 |
| JP | H07-033069 A | 2/1995 |
| JP | H09-183394 A | 7/1997 |
| JP | H09183394 A | 7/1997 |
| JP | H09263290 A | 10/1997 |
| JP | H1067378 A | 3/1998 |
| JP | H10250673 A | 9/1998 |
| JP | H10 324290 | 12/1998 |
| JP | H11 49078 | 2/1999 |
| JP | H11 59557 | 3/1999 |
| JP | H1199984 A | 4/1999 |
| JP | 2001071981 A | 3/2001 |
| JP | 2001-270486 A | 10/2001 |
| JP | 2002264882 A | 9/2002 |
| JP | 2005225489 A | 8/2005 |
| JP | 2008114851 | 5/2008 |
| JP | 4118984 B2 * | 7/2008 ............. B62M 6/45 |
| JP | 2009183394 A | 8/2009 |
| JP | 2010067378 A | 3/2010 |
| JP | 2011099984 A | 5/2011 |
| WO | 2007077827 A1 | 7/2007 |
| WO | 2011/138138 A1 | 11/2011 |

* cited by examiner

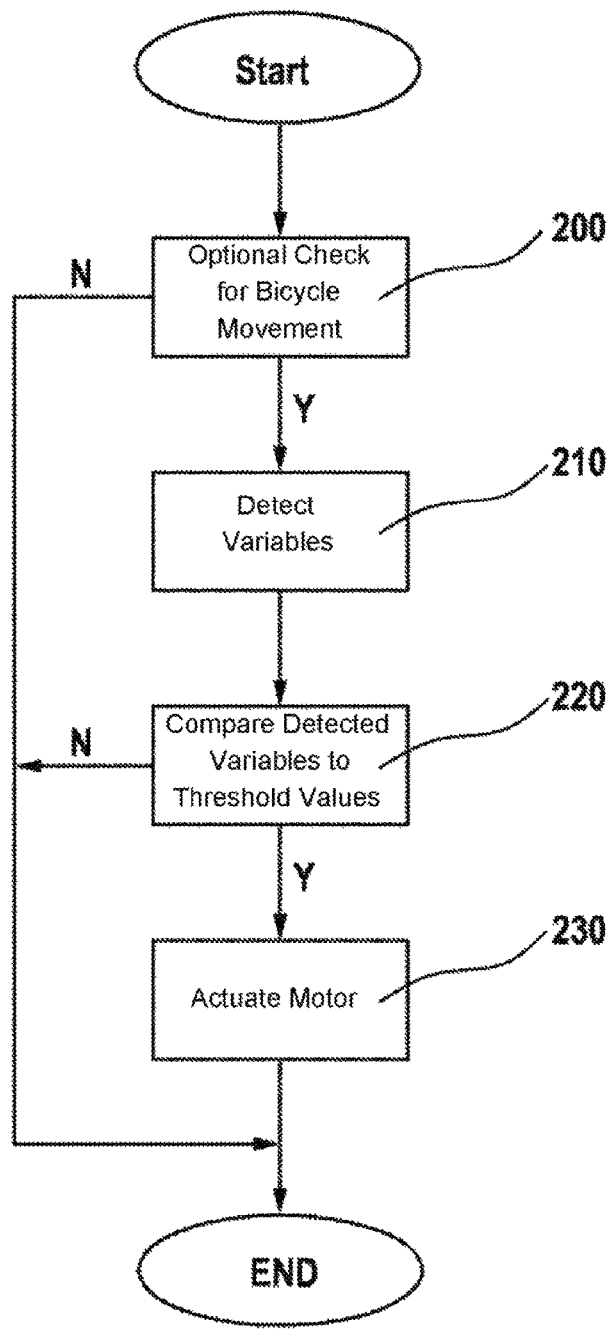

METHOD AND DEVICE FOR CONTROLLING A PEDAL-OPERATED VEHICLE

BACKGROUND OF THE INVENTION

1. Field of the Invention

The present invention relates to a method and a device for controlling a motor of a pedal- and motor-operated vehicle.

2. Description of the Related Art

Over the past few years, the use of bicycles equipped both with a muscle-powered and a motor-powered drive has been increasing. So-called electric bicycles such as E-bikes or Pedelec are equipped with a drive system which uses pedals as well as an installed motor. Depending on the development of the electric bike, the motor may provide the sole drive during conventional use or also only a supporting component of the locomotion that supports the driver in the pedal operation.

In addition, the installed motor may also support the driver when the bike is being pushed. In this case, no operation of the pedals by the driver is provided, so that it may be necessary to set a special support mode at the electric bicycle.

To use the motor as pushing aid, it is therefore possible to set the desired support via an appropriate adjustment in the HMI or the control unit of the electric bicycle, for example. The (pushing) driver will then be able to move the vehicle without much exertion because the motor of the electric bicycle moves the electric bike virtually by itself in the walking direction, without any pedal operation by the driver being necessary. This has the advantage that the driver finds it much easier to move the electric bicycle across ramps (for baby carriages) provided with steps along the side or in the middle. However, it should not be overlooked that the pedals, which are fixedly coupled to the motor and rotate along, are located at the level of the legs of the (pushing) driver. Because the driver in this (or a similar) situation may possibly not be fully aware of the rotating pedals, the legs can easily be injured by the pedals, particularly since the motor continues to drive the pedals.

Furthermore, a danger potential also exists in case of a sudden obstacle that the pedals may encounter, e.g., a stair step or a stone, since such an obstruction hampers safe pushing.

BRIEF SUMMARY OF THE INVENTION

A method as well as a control device for a pedal- and motor-driven vehicle such as a bicycle is described by the present invention. The motor in the vehicle is able to assist the driver at least in a pushing operation. The core of the present invention concerns the option of controlling this automatic driving of the motor in a pushing operation under certain circumstances, by modifying it at least briefly, such as reducing or stopping it completely.

This has the advantage that the driver while pushing does indeed obtain some assistance by the motor-supported drive on the one hand, but will not be injured as a result of sudden resistance of the pedal rotation by uncontrolled driving.

According to the present invention, the movement or the state of at least one pedal is detected in order to avoid such undesired driving. The drive or the drive output of the motor is then at least briefly varied or reduced as a function of this movement or state.

In one development of the invention, the pedal motion is detected as a function of the applied torque, the (rotational) speed or the acceleration/deceleration behavior of the pedals, the revolutions per minute and/or the force that is acting on the pedals.

In an advantageous manner, the movement or state variable of the at least one pedal is compared with a threshold value in order to modify the driving of the vehicle at least briefly as a function of the exceeding or not attaining of this threshold value. For example, it is provided that the drive output of the motor is reduced or the motor even switched off completely in a sudden deceleration of the pedal movement or a detected counteracting force that occurs when the pedals strike an obstacle.

Optionally, it may also be provided that the motor or the driving is interrupted only briefly, whereupon the movement or the state of the pedals is checked again following a certain time interval.

BRIEF DESCRIPTION OF THE DRAWINGS

FIG. 2 shows a flow chart which illustrates one possible realization of the control method of the present invention.

DETAILED DESCRIPTION OF THE INVENTION

Figure 1:
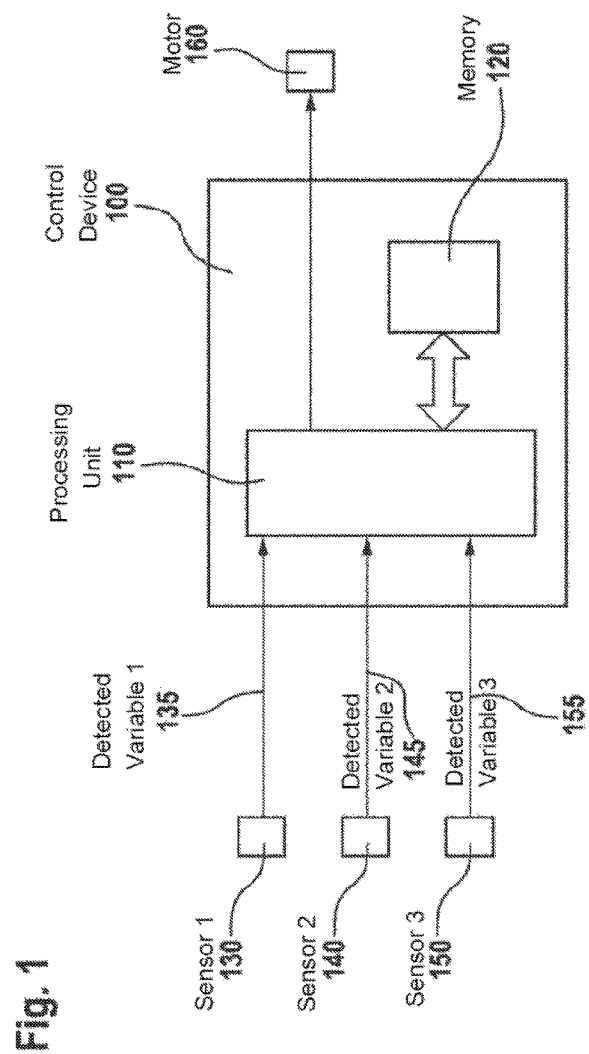
FIG. 1 schematically shows the design of a device according to the present invention.

As already explained in the introduction, the present invention is used in pedal- and motor-driven vehicles such as electric bikes, in which pushing assistance is provided by the motor in the form of a support mode, and the pedals and the motor are linked to each other. To monitor the pedal movement or the state of the pedals, a control device 100 is provided, which, for instance, may be accommodated in an HMI (human-machine interface) or in a separate control unit. As illustrated in FIG. 1, a processing unit 110 is provided in this control unit 100, which is connected to at least one sensor 130 on the one side, and optionally, to a memory 120. Starting from the sensor variable, e.g., a torque 135 detected by a torque sensor 130, processing unit 110 is able to carry out a comparison with a stored threshold value SWDreh. Depending on the result, motor 160 may subsequently be actuated in that, for example, the drive torque or the entire drive output is reduced either in part or completely. Instead of torque 135 of the pedals, it is also possible to use a suitable sensor 140 to monitor the (rotational) speed, the revolutions per minute or the acceleration of the pedals. Using these variables 145 as well, it is possible to detect whether the pedals are encountering an obstacle and are braked abruptly. Finally, the use of a force sensor 150 is another option, which detects force 155 that is acting on the pedals when they strike an obstacle in a direct manner. Such force sensors 150 are already provided in some electric bikes for estimating the actuation of the pedals by the driver, and consequently for estimating the degree of driving support provided by the motor. A corresponding threshold value for each of the detected variables is of course able to be stored in memory 120 and called up.

One possible sequence of the monitoring or control method of the present invention is illustrated in FIG. 2. In this context it may be provided that the algorithm is started automatically when the support or pushing mode is initiated. As an alternative, however, this may be preceded by another check step, which checks whether the speed of the vehicle is below a predefined threshold, e.g., a threshold that corresponds to a typical pushing behavior. Conceivable, for example, is a threshold of 4 to 6 km/h. This check is to prevent an unintended interruption of the drive during a conventional driving operation.

After the algorithm is started, it may be checked in a first optional step 200 whether the bicycle is moving at all. If the bicycle is stationary, the algorithm can be interrupted. In this case, however, it must be assumed that the support or push mode is switched off as well. In the following step 210, a variable is then detected that characterizes the movement of the pedals or the state of the pedal movement. As explained already, this movement is detectable by recording torque 135, (rotational) speed 145, the revolutions per minute, the acceleration or force 155 acting on the pedals. In order to detect a change in movement, e.g., due to the pedals hitting an obstacle (such as a stair, stone, calf or leg), it is checked in next step 220 whether the detected variable is experiencing an abrupt change. This is realized in the current step in that it is checked whether the variable exceeds a threshold value or has dropped below such a threshold value. For example, an abrupt deceleration makes it possible to detect the obstacle or obstruction in the pedal movement. When the torque is taken into consideration, the fact that the pedal has hit an obstacle may be detected by an increase in the variable. In this context, a threshold value that is greater than zero may possibly be selected, in order to disregard smaller obstacles. In general, however, a threshold value that differs from zero or from a value that differs only slightly from zero, for example, may be used for this check. In the event that this threshold value is not exceeded, i.e., it is determined that the pedals are moving freely or the obstruction is of no particular significance, the algorithm will be ended. In the other case, motor 160, which supplies the thrust for the push assistance, is actuated in step 230. In so doing, the motor output may be deactivated in a stepwise manner, using a flank, or reduced immediately or switched off completely.

In steps 210 and 220, the detection of more than one variable and the comparison with the corresponding threshold values is able to be implemented as well in an alternative development. This has the advantage that because of the detection of two independent values, the precision in detecting an obstruction of the pedals, and thus in determining the intervention in the motor control, is increased.

When executing the algorithm in FIG. 2, it may alternatively also be provided that a loop to step 200 or 210 takes place from step 220, or following the actuation of the motor in step 230.

What is claimed is:

1. A method for controlling a motor of a partially pedal-powered vehicle, the partially pedal-powered vehicle having at least one drive configured to be selectively driven by at least one of the motor and a pedal, the motor having a support mode which supports the driver in pushing the partially pedal-powered vehicle by providing a force to move the partially pedal-powered vehicle along, and relative to, a structure that is external to the partially pedal-powered vehicle and on which the partially pedal-powered vehicle is supported, the method comprising:
in the support mode, performing the following:
detecting a state variable of the pedal, wherein the state variable is at least one of a torque and a rotational speed;
determining based on the state variable that the pedal has struck an obstacle; and
responsive to the determination that the pedal has struck the obstacle, control the motor to discontinue providing the force to move the partially pedal-powered vehicle along, and relative to, the structure.

2. The method as recited in claim 1, wherein the determining that the pedal has struck the obstacle is performed by comparing the state variable with a zero threshold value.

3. The method as recited in claim 1, wherein the motor is actuated in a clocked manner as a function of the state variable of the pedal, and a new detection of the state variable is performed after the control of the motor to discontinue providing the force.

4. The method as recited in claim 1, further comprising, in the support mode, determining whether a speed of the partially pedal-powered vehicle is below a threshold speed, wherein the control of the motor to discontinue providing the force to move the partially pedal-powered vehicle in response to the determination that the pedal has struck the obstacle is performed conditional upon that the speed of the partially pedal-powered vehicle has been determined to be below the threshold speed.

5. The method as recited in claim 1, further comprising, in the support mode, determining whether a speed of the partially pedal-powered vehicle is below a threshold speed, wherein the determining of whether the pedal has struck the obstacle is performed conditional upon that the speed of the partially pedal-powered vehicle has been determined to be below the threshold speed.

6. A control device for controlling a motor of a partially pedal-powered vehicle, the partially pedal-powered vehicle having at least one drive configured to be selectively driven by at least one of the motor and a pedal, the motor having a support mode which supports the driver in pushing the partially pedal-powered vehicle by providing a force to move the partially pedal-powered vehicle along, and relative to, a structure that is external to the partially pedal-powered vehicle and on which the partially pedal-powered vehicle is supported, the control device comprising:
a control unit including a microprocessor configured to perform, in the support mode, the following:
detecting a state variable of the pedal, wherein the state variable is at least one of a torque and a rotational speed;
determining based on the state variable that the pedal has struck an obstacle; and
responsive to the determination that the pedal has struck the obstacle, control the motor to discontinue providing the force to move the partially pedal-powered vehicle along, and relative to, the structure.

7. The control device as recited in claim 6, wherein the motor is actuated in a clocked manner as a function of the state variable of the pedal, and a new detection of the state variable is performed after the control of the motor to discontinue providing the force.

8. The control device as recited in claim 7, wherein the determining that the pedal has struck the obstacle is performed by the control unit comparing the state variable with a zero threshold value.

* * * * *